(12) United States Patent
Katsuzawa et al.

(10) Patent No.: US 6,824,432 B2
(45) Date of Patent: Nov. 30, 2004

(54) TERMINAL UNIT FOR ELECTRIC MOTOR

(75) Inventors: Yukio Katsuzawa, Yamanashi (JP); Yoshinobu Maeda, Yamanashi (JP); Shinpei Uemura, Yamanashi (JP); Kazuki Yoshimura, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/983,704

(22) Filed: Oct. 25, 2001

(65) Prior Publication Data
US 2002/0050752 A1 May 2, 2002

(30) Foreign Application Priority Data
Oct. 26, 2000 (JP) .................................... 2000-326579

(51) Int. Cl.$^7$ .................................................. H01R 9/22
(52) U.S. Cl. ..................................... 439/709; 310/710
(58) Field of Search .............................. 439/709–719, 439/797, 796, 801, 805, 810, 908; 361/823, 824; 310/71

(56) References Cited

U.S. PATENT DOCUMENTS

| | | | | |
|---|---|---|---|---|
| 2,321,999 A | * | 6/1943 | Dalton | 439/709 |
| 2,531,719 A | * | 11/1950 | Alvino | 439/709 |
| 2,872,506 A | * | 2/1959 | Flubacker | 439/709 |
| 3,439,310 A | * | 4/1969 | Ryder | 439/709 |
| 4,679,888 A | * | 7/1987 | Williams | 439/883 |
| 4,782,244 A | * | 11/1988 | Wakimoto | 307/116 |
| 4,880,391 A | * | 11/1989 | Hurtgen | 439/221 |
| 5,063,314 A | * | 11/1991 | DeSantis | 310/71 |
| 5,713,766 A | * | 2/1998 | Davies et al. | 439/709 |
| 5,741,161 A | * | 4/1998 | Cahaly et al. | 439/709 |
| 6,048,219 A | * | 4/2000 | Kotowski | 439/221 |

FOREIGN PATENT DOCUMENTS

| | | |
|---|---|---|
| DE | 853606 | 10/1952 |
| DE | 4309899 A1 | 9/1993 |
| DE | 4342761 A1 | 6/1995 |
| GB | 850989 | 10/1960 |

OTHER PUBLICATIONS

European Patent Office Communication for European Patent No. 01 30 9121 dated Nov. 11, 2003.

* cited by examiner

Primary Examiner—Ross Gushi
(74) Attorney, Agent, or Firm—Staas & Halsey LLP (57) ABSTRACT

A compact terminal unit for an electric motor capable of switching over windings with ease and improving automation of assembling and inspection process of the electric motor. A terminal base is fixed at a position of a through hole formed on a housing of the electric motor. Leads of the windings of a rotor are connected with cylindrical presser portions of lead connectors by caulking. A conducting portions of the lead connectors are inserted into mounting portions of the terminal base. The power cables are connected with conducting portions with screws engaged with the conducting portions so that the power cables are electrically connected with leads of the windings. Since the leads are connected to the lead connectors with their orientations vertically under the power cable connection terminals not to be present in a space in a terminal box, an ample space for attachment of the power cables to the power cable connection terminals is secured. The switchover of windings from a delta connection to star connection and vice versa can be easily performed. Since positions and orientation of the leads are fixed at mounting portions of the terminal base, the inspection of the windings can be easily performed.

7 Claims, 11 Drawing Sheets

TERMINAL UNIT FOR ELECTRIC MOTOR

BACKGROUND OF THE INVENTION

1. Field of the Invention

The present invention relates to an electric motor, and in particular to a terminal unit for connecting leads of stator windings of the electric motor with power cables for supplying electricity from outside.

2. Description of the Related Art

Figure 12:
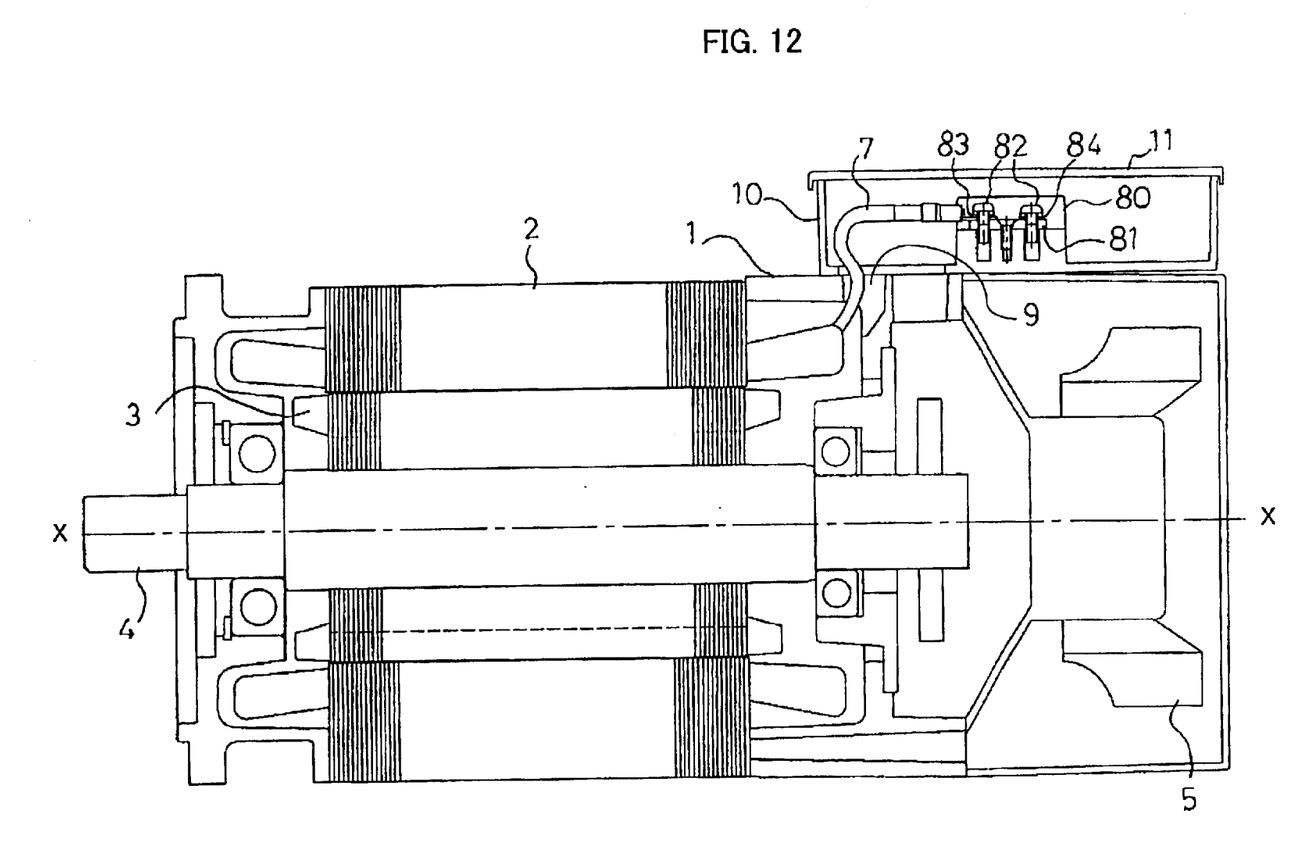
FIG. 12 is a sectional view of an electric motor along a rotor axis having a conventional terminal unit.

FIG. 12 is a sectional view of an electric motor taken along a central axis X—X of a rotor shaft 4 of an electric motor for showing an arrangement of a conventional terminal unit mounted on a housing of an electric motor. The electric motor shown in FIG. 12 is a three-phase electric motor for driving a spindle of a machine tool.

In FIG. 12, a housing 1 of the electric motor has a through hole 9 through which leads 7 from windings of respective phases U, V and W of a stator 2 are drawn out of the housing 1. A terminal box 10 having a terminal base 80 formed integrally therewith is mounted on the housing 1. The leads 7 of respective phases drawn through the through hole 9 are led into the terminal box 10, and ends of the leads 7 are respectively connected with conductive plates 81 by means of terminal members 83. In FIG. 12, reference numerals 3, and 5 denote a rotor and a fan for cooling the electric motor, respectively.

Figure 13:
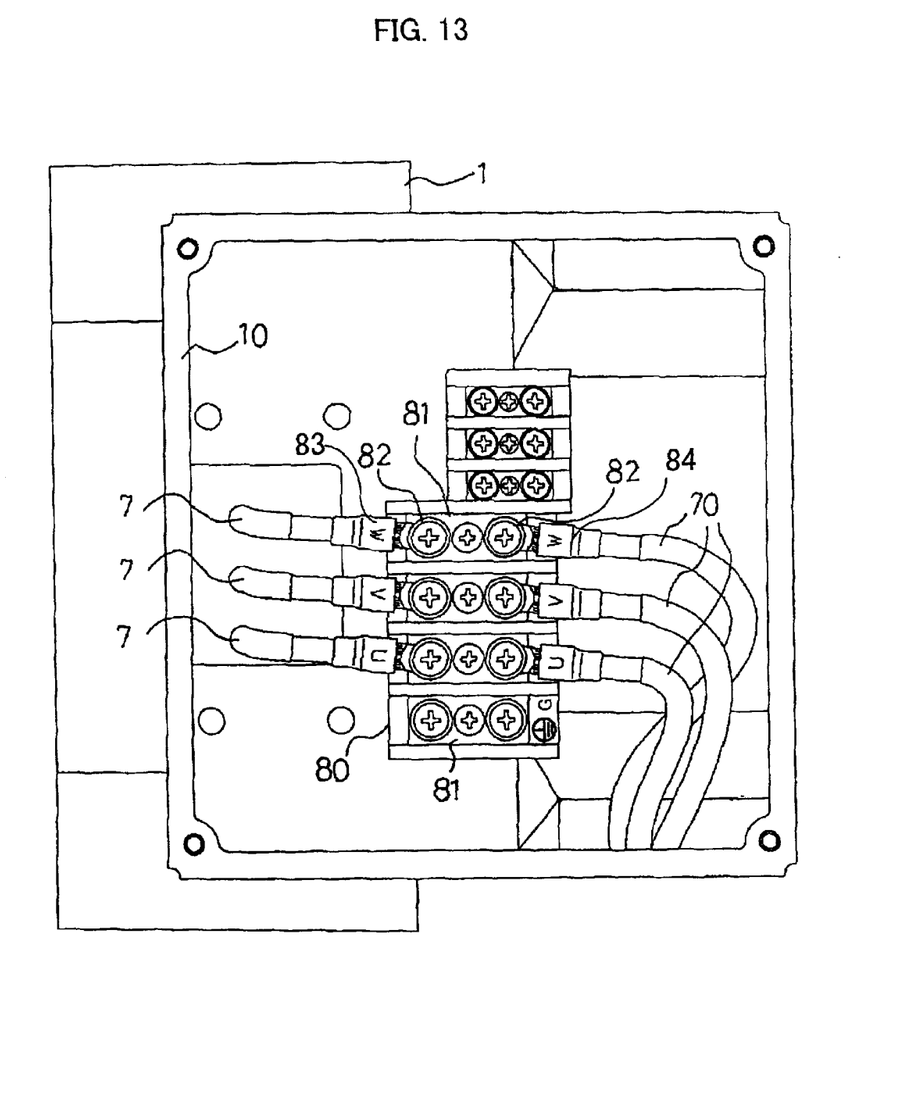
FIG. 13 is a top plan view of the conventional terminal unit as shown in FIG. 12.

FIG. 13 is a top plan view of the terminal unit shown in FIG. 12. The terminal members 83 fixed to ends of the respective leads 7 are connected to the conductive plates 81 on the terminal base 80 by means of screws 82. Terminal member 84 connected with respective ends of the power cables 70 are connected to the conductive plates 81 by means of screws 82. FIG. 13 shows an example of connection of the three leads 7 and the three power cables 70.

As described, in the conventional terminal unit, the terminal base 80 is formed integrally with the terminal box 10 or assembled in the terminal box 10 to have an integral structure. In manufacturing the electric motor, the stator 2, the rotor 3, the cooling fan 5, etc. are manufactured respectively through separate processes and are assembled together in a final assembling process. In the final assembling process, the leads 7 are drawn out of the housing 1 through the through hole 9 and let into the terminal box 10, and then the terminal box 10 is mounted on the housing 1. After the terminal box 10 is mounted on the housing 1, the terminal members 83 of the leads 7 are connected to the conductive plates 81 by rotating the screw 82 manually.

In order to improve an output power specification of the electric motor, a method of obtaining optimum velocity and torque characteristics particularly required for the electric motor has been adopted by switching over connection of windings from a star connection to a delta connection and vice versa. In this case, the three terminal connection have to be changed to six terminal connection for the switch over of the windings. In order to change to the six terminal connection, a size of the terminal base has to be made at least twice as large as the three terminals and also the terminal box has to be made larger, to hinder saving space and saving resources. Since the industry of manufacturing of machine tools, etc. has trended to saving space and saving resources, the conventional arrangement of the terminal unit is counter to the trend.

Particularly, if power cables of large diameters are used for adaptation to a safety standard, radiuses of curvature of the power cables are enlarged to make it difficult to connect them with the power cable connection terminals provided in the terminal box.

As described, connection of the leads with the power cable connection terminals is performed manually. It is not preferable that the manual operations and automatic operations are admixed in an assembling line in view of efficiency and safety, and it has been desired to render all the operations automatic.

The leads are tend to have random orientations since the leads are tend to be bent with their flexibility and it is difficult to fix the position and orientations of the leads. Thus, it is difficult to automatically screw the terminals on the terminal base. Further, in an automatic inspection of the windings of the stator, it is difficult to bring a prove in contact with the leads to make the automatic inspection hardly possible. With the above factors, a full automation of the assembling process of the electric motor has been impeded.

SUMMARY OF THE INVENTION

The present invention provides a terminal unit for an electric motor capable of obtaining an output specification of the electric motor by switching the connection of the windings with the same size as the conventional terminal unit, and also improving automation of assembling and inspection process of the electric motor.

According to a first aspect of the present invention, a terminal unit for an electric motor comprises: a terminal base fixed at a periphery or in a vicinity of a through hole formed on a housing of the electric motor; a power cable connection terminal arranged at an outer portion of the terminal base, for connection with the power cable; and a lead connector connected with the lead and arranged inner than the power cable connection terminal in a radial direction of the electric motor, and the power cable connection terminal and the lead connector are electrically connected with each other. With the above arrangement, the leads are arranged out of a terminal box and thus the leads are prevented from occupying any substantial space in a terminal box to allow the power cable to occupy a sufficient space in the terminal box.

The leads may be connected with the lead connectors at an inner position of the terminal base in the radial direction of the electric motor and the power cables are to be connected with the power cable connection terminals at an outer position of the terminal base in the radial direction of the electric motor. The leads may be connected with the lead connectors with substantially the same orientation as the lead are drawn out of the housing, and the power cables may be connected with the power cable connection terminals in a plane substantially parallel to an outer surface of the housing.

The terminal base may be positioned above the through hole formed on the housing and at an extremity in a terminal box.

According to a second aspect of the present invention, a terminal unit for an electric motor comprises: a terminal base fixed at periphery or in vicinity of a through hole formed on a housing of the electric motor; power cable connection terminals arranged on the terminal base, for connection with the power cables; and lead connectors arranged on the terminal base, each of the lead connectors having a presser portion connected with the lead and a conducting portion formed integrally with the presser portion and connected with the power cable connection terminal.

The power cable connection terminal may comprise a screw terminal, the lead connector has a form of a hook, the leads are connected with the presser portion in the radial direction of the electric motor, and an end part of the conducting portion is fitted to a rod of the screw terminal in an axial direction of the electric motor. The conducting portion may have a female screw and the conducting portion is connected with the power cable connection terminal by an threaded engagement of the screw terminal with the female screw. The presser portion is formed cylindrically with an end closed by a wall and a window is formed at a side of the cylindrical presser portion for confirming an end of the lead.

The lead connector has a linear form, the power cable connection terminal comprises a screw terminal, the leads are connected with the presser portion in the radial direction of the electric motor, and an end part of the conducting portion is fitted to a rod of the screw terminal in the radial direction of the electric motor.

The presser portion may have a cylindrical shape into which the lead is inserted and fixed by caulking, the conducting portion has a wall between the presser portion and an end part connected with the power cable connection terminal, for preventing access of an end of the lead inserted into the presser portion to the end part of the conducting portion by abutting with the end of the lead. The wall may be formed by bending the conducting portion or formed by adding an additional member to the conducting portion. A window may be formed by a gap between an end face of the presser portion and the wall for confirming and end of the lead.

Further, according to a third aspect of the present invention, a terminal unit for an electric motor comprises: a terminal base fixed at periphery or in vicinity of a through hole formed on a housing of an electric motor and having lead connector mounting portions; and lead connectors fixed at the lead connector mounting portions of the terminal base, each of the lead connectors having a power cable connection terminal for connection with the power cables, a presser portion for connection with the leads by pressing and a conducting portion for electrically connecting the power cable connection terminal and the presser portion.

BRIEF DESCRIPTION OF THE DRAWINGS

FIGS. 5a–5e illustrate attachment of the lead connector to a terminal base, of which

FIGS. 7a–7d show an alternative of the lead connector, in which

FIGS. 11a–11c illustrate a terminal unit according to a third embodiment of the present invention, of which

DETAILED DESCRIPTION OF THE PREFERRED EMBODIMENTS

Figure 1:
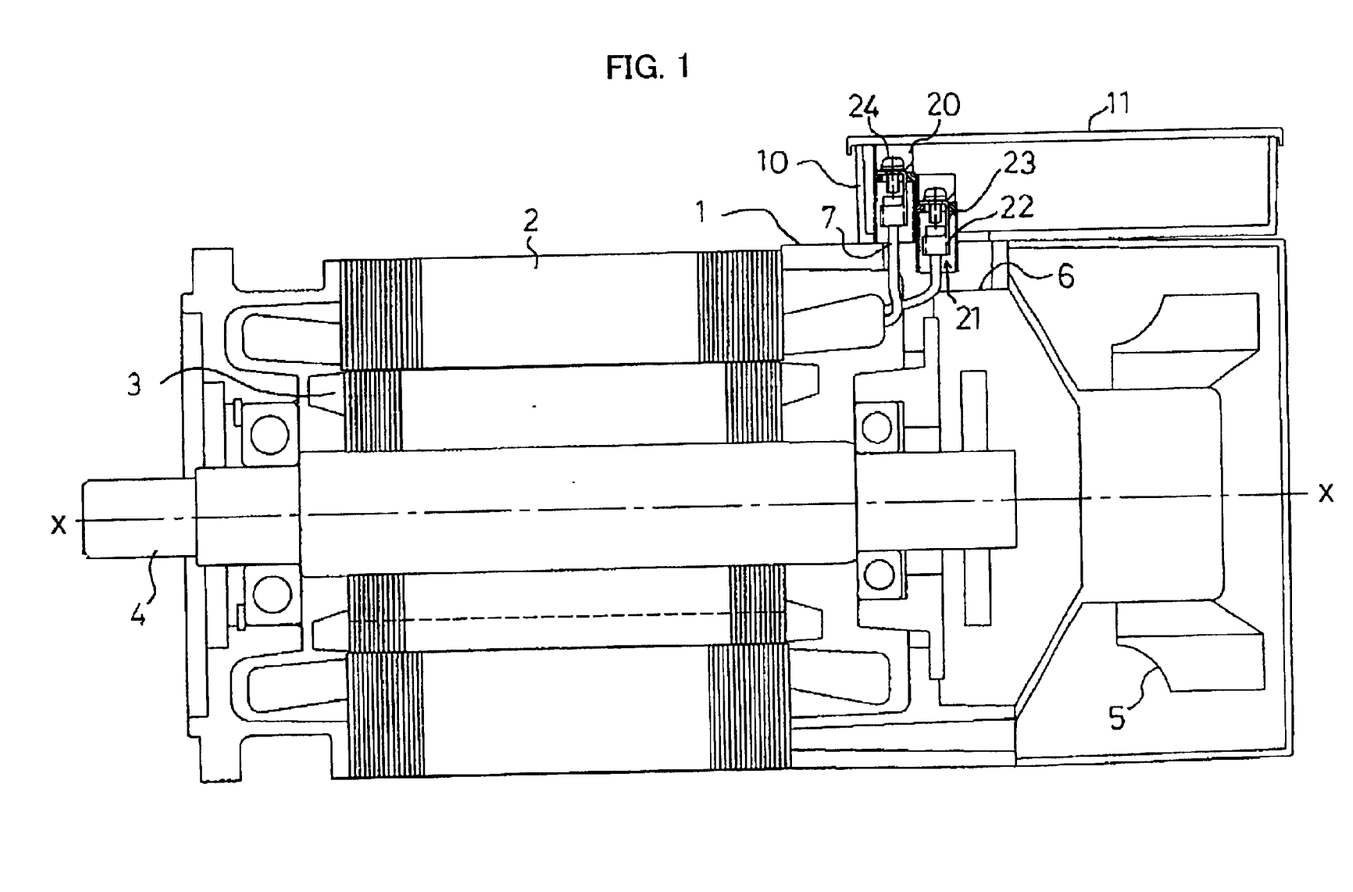
FIG. 1 is a sectional view of an electric motor along a rotor axis, having a terminal unit according to an embodiment of the present invention.
Figure 2:
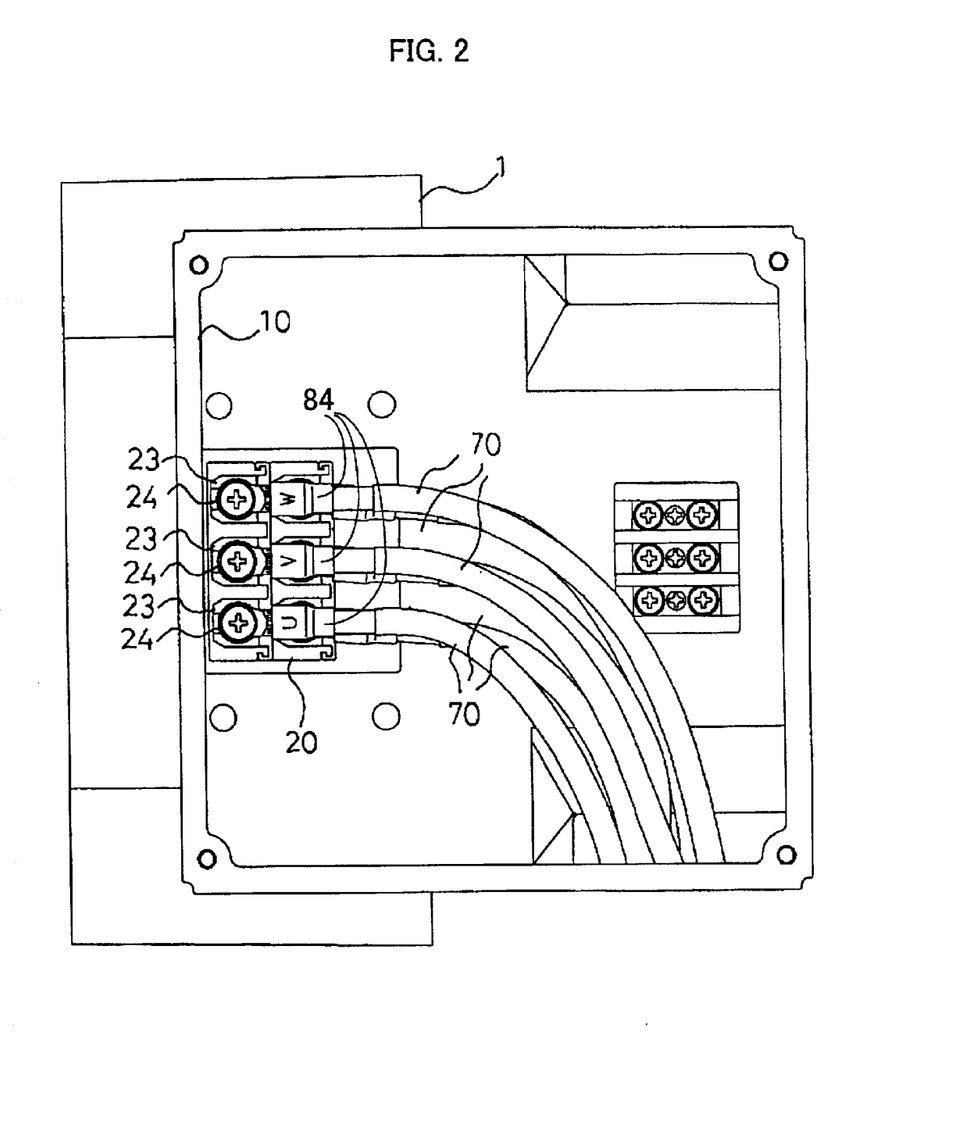
FIG. 2 is a top plan view of the terminal unit as shown in FIG. 1.

A terminal unit for an electric motor according to an embodiment of the present invention will be described referring to FIGS. 1 and 2. As shown in FIG. 1, a through hole 6 for taking out leads 7 of windings of respective phases of a stator 2 and for mounting a terminal base 20 for connecting the leads 7 with power cables 70 is formed on a housing 1 of an electric motor. The terminal base 20 is fixed on the housing 1 of the electric motor at a periphery or at least in the vicinity of the through hole 6 by means of fixtures such as set screws (not shown). In this embodiment, the terminal unit has six power cable connection terminals. As shown in FIG. 2, six terminal mounts are formed on the terminal base 20 and six lead connectors 21 are respectively attached to the six terminal mounts. The six power cable connection terminals are constituted by the six terminal mounts of the terminal base 20, the six lead connectors 21 and six screws 24 fixed to the six lead connectors 21. Each of the lead connectors 21 has a presser portion 22 for connection with an end of the lead 7 and a conducting portion 23 formed integrally with the presser portion 23, for electric connection with the power cable 70.

Each end of the lead 7 is connected with the lead connector 21 by the presser portion 22 formed at an end of the lead connector 21 towards the end of the lead 7. The conducting portion 23 at the other end of the lead connector 21 is made in contact with a terminal member 84 of the power cable 70 by means of the screw 24 so that the lead 7 is electrically connected with the power cable 70. The lead connector 21 is arranged so that the presser portion 22 is positioned below, i.e., more inside than, the conducting portion 23 and the end of the lead 7 is inserted into the presser portion 22 from underside and fitted with the presser portion 22. Specifically, the presser portion 22 is positioned more closer to the central axis X—X of the rotor shaft 4 than the conducting portion 23 on a plane perpendicular to the central axis X—X. An upper end of the conducting portion 23 is bent at substantially right angle to come in contact with the power cable 70 at the upper position of the terminal base 20. The terminal box 10 is arranged so as to cover the terminal base 20 and the terminal base 20 is arranged to be positioned at extremity in the terminal box 10. A reference numeral 11 denotes a lid of the terminal box 10.

The six power cable connection terminals for connection with the power cables 70 are formed stepwise, on the terminal base 20 in two rows. Three terminal mounts are provided on each row and the lead connectors 21 are mounted on the terminal mounts to form the six terminals with the screw 24. The terminal members 84 attached to the ends of the power cables 70 are fixed to the conducting portion 23 of the lead connector 21 by means of the screw 24 to come in contact with the conducting portion 23.

As shown in FIGS. 1 and 2, the terminal base 20 is positioned at the extremity in the terminal box 10 to form a sufficient space for drawing the power cables 70 with a large radius of curvature, so that power cables of large diameter can be connected to the lead connector 21 with ease.

Figure 3:
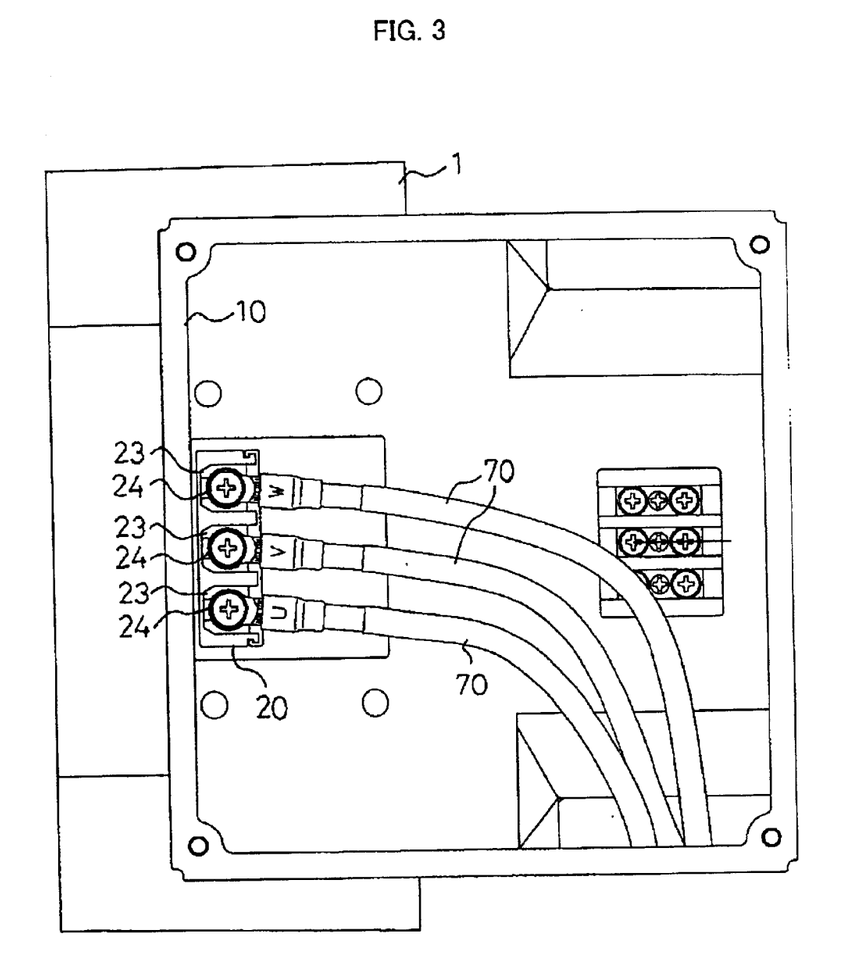
FIG. 3 is a top plan view of a terminal unit with three power cable connection terminals.
Figure 4A:
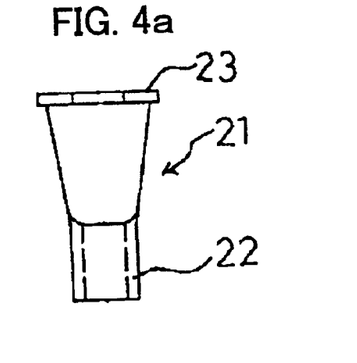
FIGS. 4a–4d are an elevation view, a top plan view, a bottom plan view, a right side view, respectively, of the lead connector as shown in FIGS. 1–3.
Figure 4B:
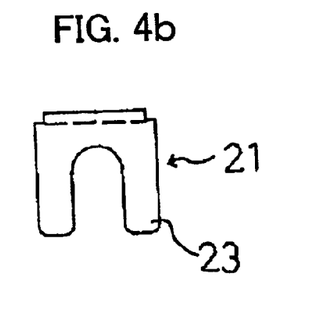
Figure 4C:
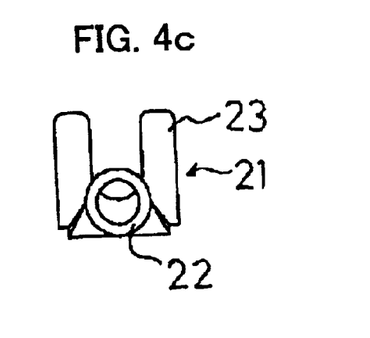
Figure 4D:
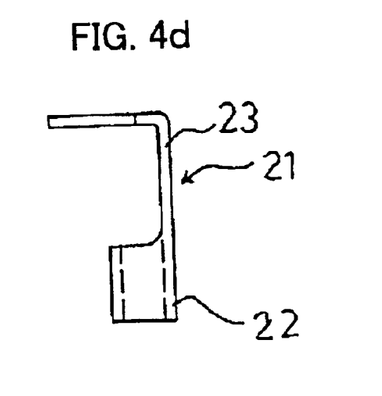

FIG. 3 shows another embodiment of the terminal base having three power cable connection terminals.

FIGS. 4a–4d are detailed views of the lead terminal 21 shown in FIGS. 1–3. The lead terminal 21 is formed from conductive material to have a shape of a hook. The presser section 22 is formed cylindrically at the bottom of the lead terminal 21 for fitting the end of the lead 7 by caulking. The conducting section 23 is formed integrally with the presser portion 22 and bent at substantially right angle to form an end part. The end part of the presser portion 23 is formed into two forks to allow the screw 24 to be inserted therebetween. A surface of the two forks are arranged to lie perpendicular to a direction of insertion of the lead 7. The forked end of the conducting portion 23 constitutes the power cable connection terminal cooperatively with the screw 24.

FIGS. 5a–5d are detailed views showing mounting of the lead connector 21 on the terminal base 20.

Figure 5A:
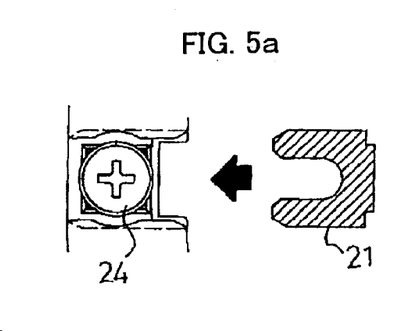
FIG. 5a and FIG. 5b are a top plan view and a side view, respectively, of the mounting portion of the terminal base and the lead connector.
Figure 5B:
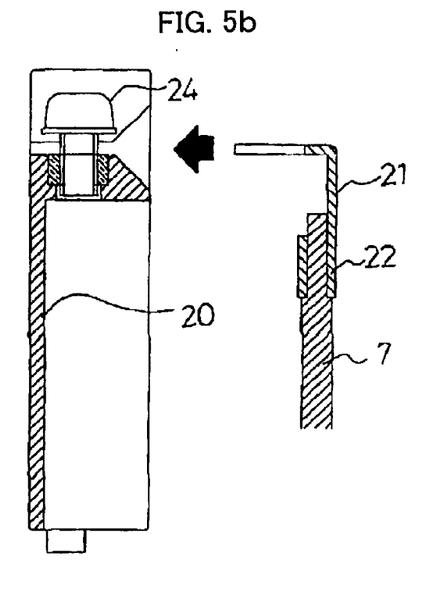
Figure 5C:
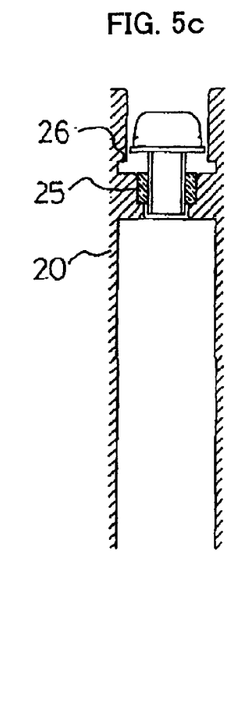
FIG. 5c is an elevation view of the mounting portion of the terminal base.
Figure 5D:
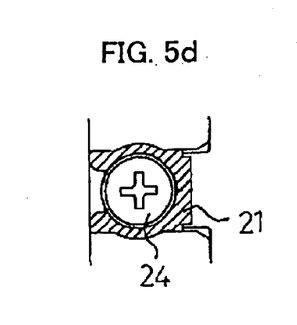
FIGS. 5d and 5e are a top plan view and a side view of the lead connector attached to the mounting portion.
Figure 5E:
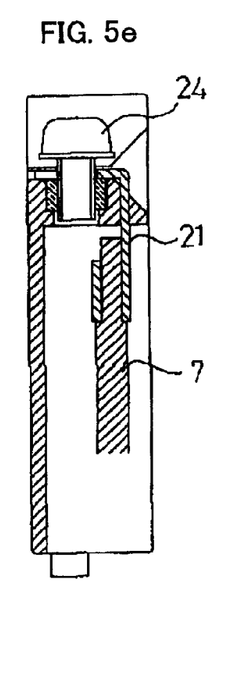

A nut 25 is fixed at each of the terminal mounts of the terminal base 20 by hot-melt fitting, as shown in FIGS. 5b, 5c and 5e. The screw 24 is threadedly engaged with the nut 25. Grooves 26 for guiding the forked ends of the conducting portion 23 are formed at the terminal mount on both sides of the screw 24.

The end of the lead 7 is inserted into the cylindrical presser portion 22 of the lead connector 21 and caulked to be fixed therewith. The engagement of the screw 24 on the nut 25 is loosen to form a gap between a head of the screw 24 and the nut 25. Then, the forked ends of the conducting portion 23 are inserted into the gap to position a threaded rod of the screw 24 therebetween. The forked ends are guided by the grooves 26 to be inserted below the head of the screw 24, as shown in FIGS. 5d and 5e. The terminal member 84 of the power cable 70 is inserted between the head of the screw 24 and the forked ends of the conducting portion 23 and the terminal member and the lead connector 21 are fastened together to be electrically connected with each other by rotating the screw 24 to be fitted with the nut 25. Thus, the power cable 70 is connected with the lead of the winding of the rotor.

The attachment of the terminal base and the terminal box to the housing of the electric motor will be described. First, the ends of the leads 7 of the windings are drawn out of the housing 1 through the through hole 6 and the lead connectors 21 are fixed to the respective ends of the leads 7 by inserting the ends into the cylindrical presser portions 22 and pressing the presser portions 22 towards the respective ends. Then, the terminal base 20 is mounted on the housing at the periphery of the through hole 6. The lead connector 21 is fitted to the terminal mount by inserting the forked ends of the conducting portion 23 into the gap between the nut 25 and the screw 24 and rotating the screw 24 to be fitted into the nut 24. Then, the terminal box 10 is mounted on the housing 1 so that the terminal base 20 is positioned at extremity in the terminal box 10. Finally, the lid 11 is fitted on the terminal box 10.

After the assemble of the terminal base and the terminal box is completed, an inspection of the winding is performed. Since the lead connectors 21 are fitted on respective terminal mounts of the terminal base 20 to fix the positions of respective leads 7, the inspection of the windings can be performed easily by moving a prove to the fixed positions of the leads 7.

The leads 7 are connected with the lead terminals below the terminal base 20 with the substantially same orientation as the lead 7 is drawn out of the housing 1 at the position of the through hole 6. Therefore, the leads 7 do not occupy any substantial space in the terminal box 10. The power cables 70 are connected with the power terminals in a plane substantially parallel to an upper surface of the housing 1 in a sufficient space in the terminal box 10. The power cables 70 can be connected with the power cable connection terminals without being bent at small radiuses of curvature, to make a connection operation easy.

In the above first embodiment, the forked end of the conducting portion 23 of the lead connector 21 is formed above the presser portion 22 in the direction of inserting the lead 7 into the presser portion 23, as shown in FIG. 4. Namely, the forked end of the conducting portion 23 is formed across a line of insertion of the lead 5 into the cylindrical presser portion 22. With this arrangement, the end of the lead 7 may reach the forked end of the conducting portion 23 to cause an obstacle in inserting the lead connector 21 into the terminal base. Particularly, the obstacle may frequently occur in the case where the cut end of the lead 7 is not sufficiently trimmed. In the case of the lead comprising a hard and thick enamel wire, even if the cut wire is sufficiently trimmed before insertion into the presser portion 22, the end of the lead 7 may deform to have an irregular form while inserting the end into the presser portion 22 and caulking the presser portion 22 towards the end, to disturb the fitting of the lead connector 21 to the terminal base.

Figure 6:
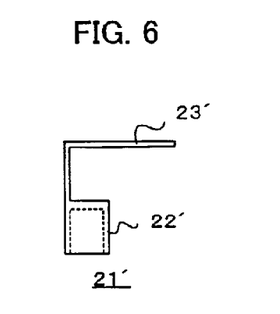
FIG. 6 is a side view of an alternative example of the lead connector in which an end of the presser portion is closed.

In order to overcome the above problem, a lead connector 21' having a presser portion 22' with a closed end as shown in FIG. 6 may be adopted. With this structure, the inserted end of the lead 7 is brought into contact with the closed end of the presser portion 22' to prevent the end of the lead 7 from obstructing the fitting of the lead connector 22' into the terminal base. With this structure, however, it would be difficult to find out a lead insufficiently inserted into the presser portion 22'.

FIGS. 7a–7d show an alternative of the lead connector 21, which is capable of preventing the end of the lead 7 from obstructing the mounting of the lead connector on the terminal base 20 and also confirming a sufficient insertion of the end of the lead 7 into the presser portion.

A lead connector 121 is formed from conducting material and comprises a cylindrical presser portion 122 for connection with an end of the lead 7 by caulking and a conducting portion 123 formed integrally with the presser portion 122 in the same manner as the lead connector 121 shown in FIG. 4, but different from the lead connector 121 in a structure of the conducting portion 123. The conducting portion 123 comprises a forked end 123a for the power cable connection terminal, and a midsection 123b for connecting the forked end 123a and the presser portion 122. The midsection 123b extends from the presser portion 122 in a direction of insertion of the lead 7 and bent at a position apart from an end of an upper end plane of the presser portion 122 at right angle to form a wall 123c parallel to the end plane of the presser portion 122, and bent at right angle to extend in the direction of insertion of the lead 7 and then bent at right angle to form the forked end 123a.

Figure 7A:
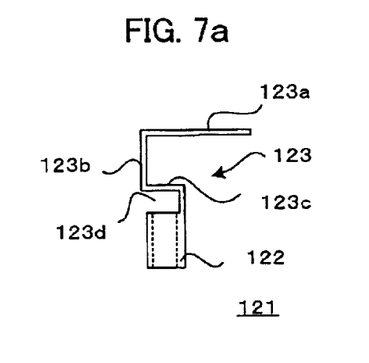
FIGS. 7a and 7b are side and perspective views of the lead connector, respectively.
Figure 7B:
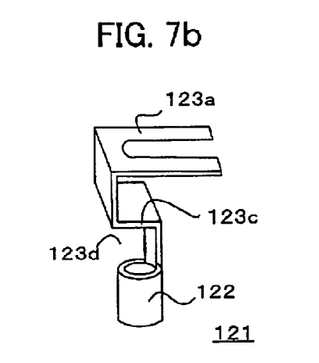
Figure 7C:
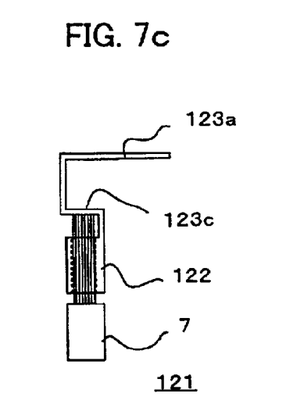
FIGS. 7c and 7d are side and sectional views, respectively, of the lead connector with an end of the lead fixed.
Figure 7D:
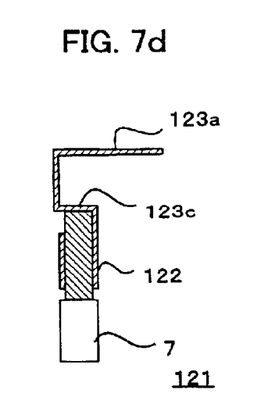

As shown in FIGS. 7c and 7d, the end of the lead 7 is inserted into and through the presser portion 122 to be brought into contact with the wall 123c of the midsection 123b which is parallel to the upper plane of the presser portion 122. In this insertion, a load of insertion force increases when the end of the lead 7 comes in contact with the wall 123c to notify an operator of the contact with the wall 123c. A clearance between the wall 123c and the presser portion 122 is utilized as a window 123d for confirming a connection between the lead 7 and the presser portion 122. The end of the lead 7 is arrested by the wall 123c not to reach the position of the forked end 123a, not to obstruct the fitting of the lead connector 121 to allow the operator to easily fit the lead connector to the terminal base.

Figure 8A:
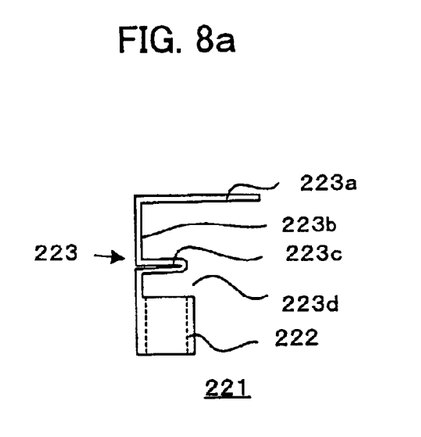
FIGS. 8a and 8b are a side view and a front elevation of another alternative of the lead connector.
Figure 8B:
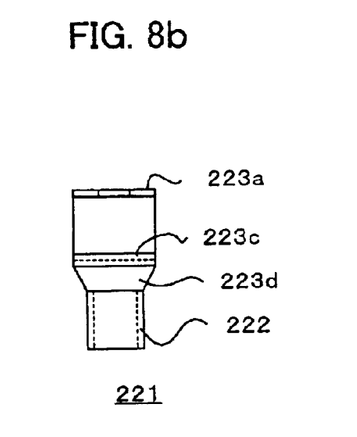

FIG. 8 shows another embodiment of the lead connecting member. The lead connecting member 221 differs from the lead connecting member 121 shown in FIG. 7 in a structure of the midsection 223b of the conducting plate 223. The midsection 223b extending from a presser portion 222 is bent at right angle to extend parallel to an upper face of the calking portion 222 and further bent at 180' to form a wall 223c by the folded plates for preventing access of the end of the lead 7 to the conducting plate 223. The conducting plate 223 is then bent at right angle to extend in the direction of insertion of the lead 7 and further bent at right angle to form the forked end 223a. A gap 223d is formed between the wall 223c and the upper end face of the presser portion 222. The function and effects are the same as that of the lead connector 121 as shown in FIG. 7.

Figure 9A:
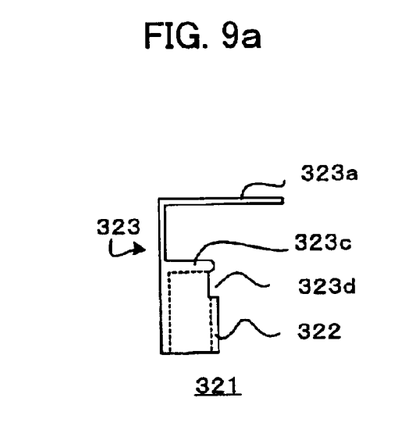
FIGS. 9a and 9b are a side view and a front elevation of still another alternative of the lead connector.
Figure 9B:
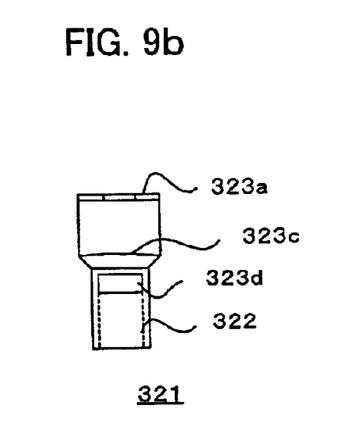

FIG. 9 shows still another embodiment of the lead connecting member. An upper end face of a cylindrical conducting portion 322 is closed by a wall 323c to prevent access of the end of the lead 7. The wall may be formed by bending the midsection 323b of the conducting portion 323. A window 323d is formed at the upper and side position on the presser portion 322 so that state of the end of the lead 7 inserted into the presser portion 222 is confirmed through the window 323d. In this embodiment, the end of the lead 7 is arrested by the wall 323c not to reach the position of the forked end 323a, not to obstruct the fitting of the lead connector 121 to allow the operator to easily fit the lead connector to the terminal base.

In the above embodiments of the lead connector, the wall for preventing access of the lead 7 is formed by a part of the conducting portion. The wall may be provided by adding an additional member to the conducting portion. For example, an additional member may be added to the conducting portion 23 between the presser portion 222 and the upper end of the conducting portion 23 in FIG. 4.

Figure 10:
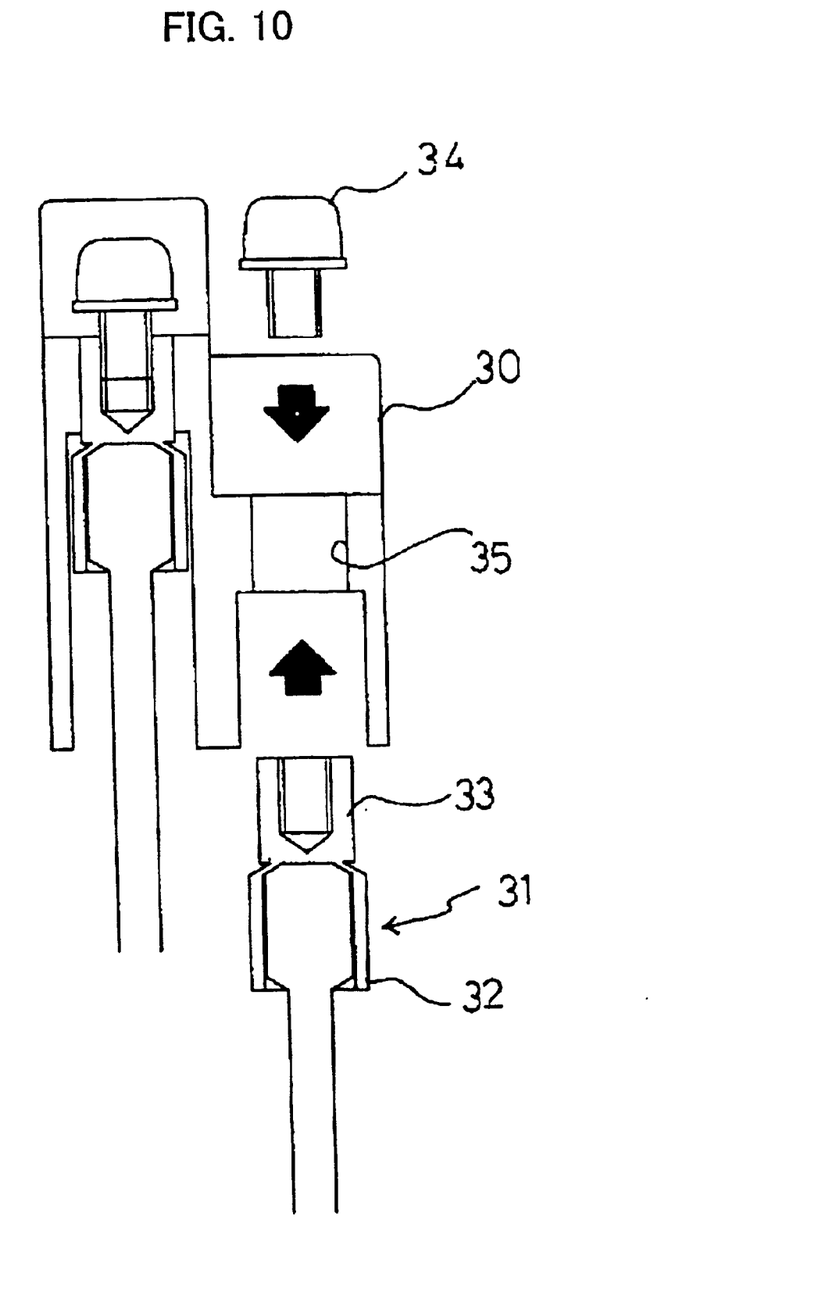
FIG. 10 is a schematic view of a terminal unit according to a second embodiment of the present invention.

FIG. 10 shows a terminal base according to a second embodiment of the present invention.

In this embodiment, the terminal base 30 has fitting holes for fitting in lead connectors 31 at respective terminal mounting portions. The lead connector 31 comprises a presser portion 32 for connection with an end of the lead 7 by caulking, and a conducting portion 33 formed integrally with the presser portion 32, for connection of the power cable 70. The presser portion 32 has a cylindrical shape to form a hole inside into which the end of the lead 7 is inserted from a lower position. The conducting portion 33 has a female thread formed inside in an axial direction of the lead connector 31 (the same direction as that of the hole of the presser portion 32) at the central position thereof. The conducting portion 33 is fitted into the fitting hole 35 formed in the mounting portion. Then, a threaded portion of the screw 34 is brought into engagement with the female thread of the conducting member 33 of the lead connector 31. The lead connector 31 with its conducting portion filled into the fitting hole 35 is shown on the left side of the lead terminal base at a mounting portion in the upper row.

In this second embodiment, each terminal comprises the lead and power terminal mounting portions of the terminal base 30, the lead connector 31 and the screw 34. The power terminal member of each power cable 70 is inserted between the head of the screw 34 and the conducting portion 33 of the lead connector 31 and the power terminal member is connected with the conducting portion 33, so that the power cables 70 are electrically connected with the leads 70 from the windings of the stator.

FIGS. 11a–11e show a terminal unit according to a third embodiment of the present invention.

Figures 11A, 11B, 11C:
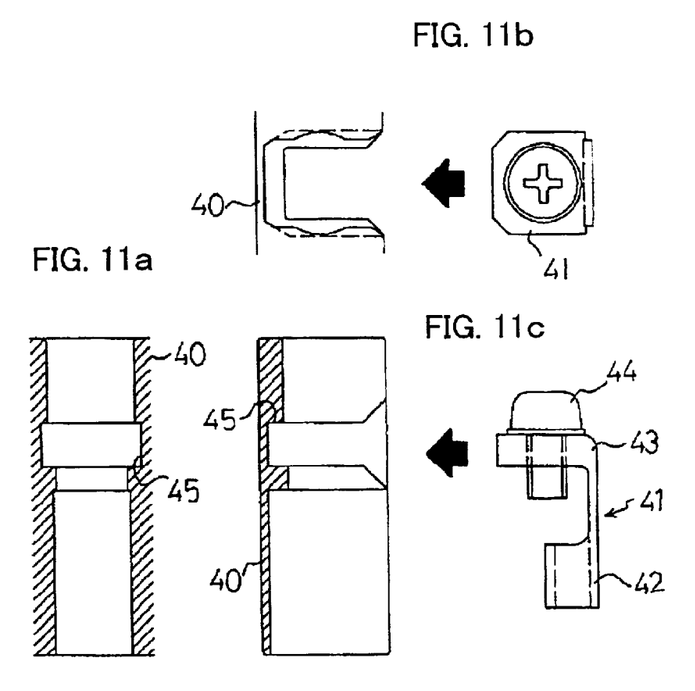
FIG. 11a is a front elevation view of the mounting portion of the terminal base.
FIG. 11b and FIG. 11c are a top plan view and a side view, respectively, of the mounting portion of the terminal base and the lead connector.

In this embodiment, a lead connector 41 is fitted into a fitting groove 45 formed at a terminal mount of a terminal base 40. The arrangement of this embodiment is different from the first embodiment in that a female thread is formed at the bent end portion of a conducting portion 43 of a lead connector 41 having a larger thickness, and a screw 44 is engaged with the female thread of the conducting portion 43. The end of the conducting portion 43 is fitted into the fitting groove 45 to fix the lead connector 41 to the mounting portion of the terminal base 40.

Figure 11D:
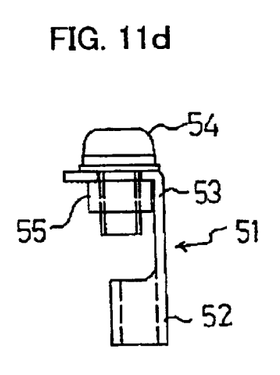
FIGS. 11d and 11e are side views of alternatives of the lead connectors for the lead connector shown in FIGS. 11a–11c.

FIG. 11d shows an alternative of the lead connector in this embodiment. A nut 55 is fixed by welding on an end of a conducting portion 53 of a lead connector 51. The end of the lead connector 51 with the nut 55 is inserted into the groove formed at the mounting portion of the terminal base.

Figure 11E:
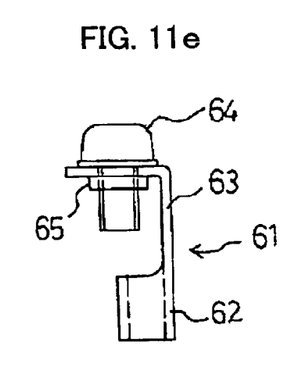

FIG. 11e shows another alternative of the lead connector. A protrusion 65 is formed at an end of a conducting portion 63 by a burring process and a female thread is formed at the protrusion 65 to be engaged with a nut 64. The end of the lead connector 61 with the protrusion 65 is inserted into the groove formed at the mounting portion of the terminal base.

In the above described embodiments, the insertion hole formed at the presser portion of the lead connector is directed to substantially the same direction as the leads are drawn out of the housing of the electric motor (the direction of the through hole formed in the housing). The direction of the power cable lays in a plane perpendicular to the axial direction of the insertion hole which is substantially parallel to an upper surface of the housing of the electric motor. With this arrangement, the leads can be connected to the lead connectors and then fixed to the mounting portions of the terminal base without bending excessively or applying excessive force. The power cables can be connected with the power terminal mounting portions with an orientation substantially the same as the power cables are drawn along the surface of the housing. The terminal base is arranged offset to one side in the terminal box and the leads extend downwardly from the lead connector not to appear in the terminal box, a large space for connection of the power cables to the power terminal mounting portions is formed in the terminal box. The power cables can be easily connected to the power terminal mounting portions with a larger radius of curvature in the large space in the terminal box even if the power cables have large diameters.

According to the present invention, the space capable of being occupied by the power cables in connection of the power cable to the power terminal mounting portions is made larger so that a switching of windings of the stator for improving a performance of the electric motor is easily carried out. In manufacturing of the electric motor, the drawing and assembling of the leads are made easy. Further, the positions of the leads are fixed to make the inspection of the windings easy, to facilitate a full automatic assembling of the electric motor to lower the cost of manufacture.

What is claimed is:

1. A terminal unit for electrically connecting a plurality of leads of windings of a stator of an electric motor with a plurality of power cables for supplying electricity to the windings, comprising:

a terminal base fixed at periphery or in vicinity of a through hole formed on a housing of the electric motor;

power cable connection members arranged on said terminal base and supported by said terminal base, each for connection with corresponding power cables; and lead connectors arranged on said terminal base, one of the lead connectors having a presser portion connected with a corresponding lead and a conducting portion formed integrally with the presser portion and connected with a corresponding power cable connection member, wherein said presser portion has a cylindrical shape into which the corresponding lead is inserted and fixed by caulking, said conducting portion having a wall between the presser portion and an end part connected with the corresponding first terminal, for preventing access of an end of the corresponding lead inserted into the presser portion to the end part of the conducting portion by abutting with the end of the corresponding lead, conducting portion by abutting with the end of the corresponding lead.

2. A terminal unit for an electric motor according to claim 1, wherein said wall is formed by bending the conducting portion.

3. A terminal unit for an electric motor according to claim 1, wherein a window is formed by a gap between an end face of the presser portion and said wall for confirming an end of the corresponding lead.

4. A terminal unit for electrically connecting a plurality of leads of windings of a stator of an electric motor with a plurality of power cables for supplying electricity to the windings, comprising:

a terminal base fixed at periphery or in vicinity of a through hole formed on a housing of an electric motor and having lead connecting positions; and lead connectors fixed at corresponding lead connecting positions of said terminal base, one of the lead connectors being connected to a power cable connection member for connection with a corresponding power cable and supported by said terminal base, with the one lead connector having a presser portion for connection with a corresponding lead by pressing and a conducting portion for electrically connecting the power cable connection member and the presser portion, wherein said presser portion has a cylindrical shape into which the corresponding lead is inserted and fixed by caulking, said conducting portion has a wall between the presser portion and an end part connected with the first terminal, for preventing access of an end of the corresponding lead inserted into the presser portion to the end part of the conducting portion by abutting with the end of the corresponding lead.

5. A terminal unit for an electric motor according to claim 4, wherein said wall is formed by bending the conducting portion.

6. A terminal unit for an electric motor according to claim 4, wherein said wall is formed by adding an additional member to the conducting portion.

7. A terminal unit for an electric motor according to claim 4, wherein a window is formed by a gap between the end face of the presser portion and the wall for confirmation of the corresponding lead in the presser portion.

* * * * *

UNITED STATES PATENT AND TRADEMARK OFFICE
CERTIFICATE OF CORRECTION

PATENT NO. : 6,824,432 B2
DATED : November 30, 2004
INVENTOR(S) : Yukio Katsuzawa et al.

It is certified that error appears in the above-identified patent and that said Letters Patent is hereby corrected as shown below:

Title page,
Item [57], ABSTRACT,
Delete in its entirety and replace with the following:
    A compact terminal unit for an electric motor capable of switching over windings with ease and improving automation of assembling and inspection process of the electric motor. A terminal base is fixed at a position of a through hole formed on a housing of the electric motor. Leads of the windings of a stator are connected with cylindrical presser portions of lead connectors by caulking. A conducting portions of the lead connectors are inserted into mounting portions of the terminal base. The power cables are connected with conducting portions with screws engaged with the conducting portions so that the power cables are electrically connected with leads of the windings. Since the leads are connected to the lead connectors with their orientations vertically under the power cable connection terminals not to be present in a space in a terminal box, an ample space for attachment of the power cables to the power cable connection terminals is secured. The switchover of windings from a delta connection to star connection and vice versa can be easily performed. Since positions and orientation of the leads are fixed at mounting portions of the terminal base, the inspection of the windings can be easily performed.
Item [73], Assignee, delete "." after "Ltd".

Column 5,
Line 53, change "rotor" to -- stator --.

Column 6,
Lines 3 and 4, delete "and the terminal box is".
Line 24, change "23" to -- 22 --.
Line 26, change "5" to -- 7 --.
Line 59, change "121" to -- 21 --.

UNITED STATES PATENT AND TRADEMARK OFFICE
CERTIFICATE OF CORRECTION

PATENT NO. : 6,824,432 B2
DATED : November 30, 2004
INVENTOR(S) : Yukio Katsuzawa et al.

It is certified that error appears in the above-identified patent and that said Letters Patent is hereby corrected as shown below:

<u>Column 7,</u>
Line 25, change "180'" to -- 180° --.

Signed and Sealed this

Seventh Day of February, 2006

JON W. DUDAS
*Director of the United States Patent and Trademark Office*